United States Patent Office 3,556,766
Patented Jan. 19, 1971

3,556,766
1-ARYLBIURETS AS PLANT GROWTH REGULANTS
William D. Mitchell, Chadds Ford, Pa., assignor to E. I. du Pont de Nemours and Company, Wilmington, Del., a corporation of Delaware
No Drawing. Continuation-in-part of application Ser. No. 698,135, Jan. 16, 1968. This application Dec. 26, 1968, Ser. No. 787,274
Int. Cl. A01n 9/20, 9/12
U.S. Cl. 71—120                                              3 Claims

ABSTRACT OF THE DISCLOSURE

Several 1-arylbiurets when applied to grape plants at flowering results in an increase in the number and size of grapes set. The compounds also prolong the life of harvested green leafy vegetables.

CROSS REFERENCE TO RELATED APPLICATIONS

This application is a continuation-in-part of my copending application Ser. No. 698,135, filed Jan. 16, 1968, now abandoned.

BRIEF SUMMARY OF THE INVENTION

Several 1-arylbiurets are useful as plant growth regulants. These biurets are: 1-m-fluorophenylbiuret; 1-m-fluorophenyl-4-thiobiuret; 1-m-tolylbiuret and 1-phenylbiuret. These compounds are particularly active in improving the yield by promoting the fruit set and increasing the size of fruits or crops such as grapes and peaches. The compounds are applied to the florets, foliage, or both at the time of anthesis, at growth regulating amounts which vary from 50 to 2,000 p.p.m.

DESCRIPTION OF THE INVENTION 1-m-fluorophenylbiuret can be made by the art methods for making biurets. For example, it can be prepared by the reaction of nitrobiuret with m-fluoroaniline as illustrated by the following equation:

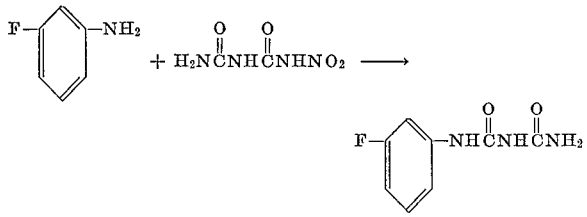

1-phenylbiuret (M.P. 164.5–165° C.) and 1-m-tolylbiuret can be prepared similarly by the use of aniline and m-toluidine, respectively, instead of the m-fluoroaniline.

The 1-m-fluorophenyl-4-thiobiuret can be prepared by the reaction of m-fluorophenyl isocyanate with thiourea:

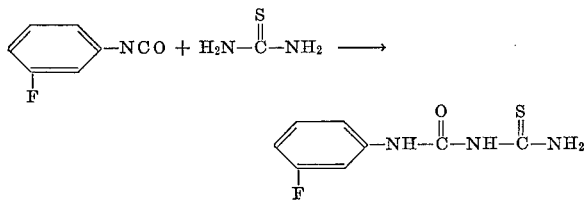

When the compounds are used to increase the yield of grape plants, by increasing the number and size of berries set, they should be applied to the florets or foliage, or both, at the time of anthesis. Preferably, the applications are made two or three times, spaced at approximately weekly intervals beginning at early anthesis. The rates of applications vary from 50 to 2,000 p.p.m., depending on the time, method of application and the crop. For floral dips, the lower rates are preferred, while the higher rates are employed for overall sprays. For floral dips the preferred rates are 50 to 500 p.p.m., while 500 to 2,000 p.p.m. are preferred for the spray applications.

For small scale experimental use, the biurets can be applied as a spray from a simple solution in a non-phytotoxic solvent. Such materials as ketones, chlorinated hydrocarbons, esters, amides, ethers, and the like are suitable. For larger scale application, it is more convenient to apply aqueous sprays. Preferred concentrates for aqueous sprays are wettable powders containing 10 to 90% of the biuret and finely ground aqueous suspensions containing 10 to 60% of the biuret. Application of dusts is feasible and such dusts can contain from 1% to 30% of the biuret and, in the simplest case, 70 to 99% inert diluent. The greater accuracy of spray application generally gives an advantage over dust application.

Emulsifiable concentrates can also be prepared by choice of suitable inert, water-immiscible solvents for the active ingredient and suitable emulsifiers. Due to the relative insolubility of the biurets in common water-immiscible solvents, however, the active ingredient content of such emulsifiable concentrates is generally below 25% and emulsifier levels in the range of 3 to 10% are usually needed. Thus, the more concentrated wettable powders and aqueous suspensions offer an economic advantage.

Wettable powders will ordinarily contain 10–90% of the biuret, 1–8% surfactant or surfactant mixture, and 2–89% inert solid diluent. They can also contain minor amounts of corrosion inhibitors, antifoam agents, coloring materials, anti-caking agents, stabilizers, etc. The surfactants may be cationic, anionic or nonionic. A detailed list of surface active agents is set forth in "Detergents and Emulsifiers, 1967 Annual" by John W. McCutcheon, Inc. Anionic and nonionic surfactants are preferred and preferred anionic surfactants are alkali metal salts of alkyl-arylsulfonic acids such as dodecylbenzenesulfonic acid and alkylnaphthalenesulfonic acid; fatty alcohol sulfates, such as sodium lauryl sulfate; dialkyl sodium sulfosuccinates, particularly the dioctyl ester; and sodium dodecyldiphenyl ether disulfonate. Preferred nonionic surfactants are alkyl-phenoxy poly(ethyleneoxy)ethanols such as the ethylene oxide adducts with octyl-, nonyl- and dodecylphenol; alkanol polyethylene glycol adducts such as the trimethyl-nonyl polyethyleneglycol ethers; and polyethylene adducts with fatty acids, rosin acids, long chain alkyl mercaptans, sorbitan fatty acid esters or polypropylene oxides. Frequently the wettable powder will contain in addition to a wetting surfactant, an additional surfactant chosen for excellent dispersant activity. Preferred dispersants are alkali metal and alkaline earth salts of likninsulfonic acids and polymeric alkylnaphthalenesulfonic acids; methyl cellulose; and polyvinyl alcohol.

Suitable inert solid diluents include the natural clays, e.g., attapulgite, kaolinite, diatomaceous earth, pyrophyllite, talc, synthetic mineral fillers such as the synthetic fine silicas and calcium or magnesium silicates, carbonates, phosphates and sulfates; and flours derived from natural sources such as walnut shell, redwood, cotton seed, and the like. The wettable powders can be prepared by blending the ingredients and, ordinarily, by grinding them to produce fine particles which will give good biological activity and suspension characteristics in the final product.

Aqueous suspension concentrates will ordinarily contain from 10 to 60% of the finely divided biuret in an aqueous medium. They may also contain surfactants and solid inert diluents as described above, viscosity modifiers, thickeners or suspending agents such as gelling clays or hydrophilic polymers, and anti-freeze agents. Minor amounts of anti-microbial agents may also be included for stability. The suspension concentrates are prepared by sandgrinding or ballmilling, or by mechanical dispersion of very finely ground material in water. The particles in such concentrates are generally below 5 microns in diameter.

When it is desired to apply the biuret with relatively large amounts of surfactants, it is more convenient to add the adidtional surfactant directly to the spray tank.

It is particularly advantageous to combine the compounds of the invention with gibberellic acid for application to fruits. The combination of 100–500 p.p.m. of the biuret and 10–80 p.p.m. of gibberellic acid when applied to grapes gives a greater yield or fruit than the biuret treatment alone.

The invention wil now be exemplified by the following examples, in which parts by weight are used unless otherwise indicated.

EXAMPLE 1

Preparation of 1-m-fluorophenylbiuret

To a solution of 8 parts of nitrobiuret in 100 parts of a 1:1 mixture of dioxane and water is added 6 parts of m-fluoroaniline and the resulting mixture is stirred for one hour. The mixture is heated to reflux for 5 hours and then cooled. Upon addition of water, a solid separates. It is filtered, washed with water, and dried to give 8 parts. M.P. 133–145° C. Crystallization from ethanol gives 5.5 parts of 1-m-fluorophenylbiuret, M.P. 152–154° C.

EXAMPLE 2

Preparation of 1-m-fluorophenyl-4-thiobiuret

A mixture of 6.85 parts of m-fluorophenyl isocyanate and 3.8 parts of thiourea is heated on a steam bath for 5 hours. The solid white residue is washed with hexane, dried, and recrystallized from aqueous methanol to give 3.0 parts of 1-m-fluorophenyl-4-thiobiuret, M.P. 192–193° C.

EXAMPLE 3

| | |
|---|---|
| 1-m-fluorophenylbiuret | 50 |
| Dioctyl sodium sulfosuccinate | 0.5 |
| Partially desulfonated sodium lignin sulfonate | 3 |
| Attapulgite | 46.5 |

The ingredients are blended, passed through a fluid energy mill to produce particles essentially all below 20 microns, reblended, sifted through a U.S.S. #50 sieve (0.3 mm. opening) and packaged. This wettable powder is dispersed in water for spray application. One part of this powder can be diluted with 4 parts of talc to produce a 10% dust.

EXAMPLE 4

| | |
|---|---|
| 1-m-fluorophenylbiuret | 80 |
| Alkylarylpolyether alcohol (40% on magnesium carbonate) | 2 |
| Low viscosity methyl cellulose | 2 |
| Silica aerogel | 1 |
| Kaolinite | 15 |

The ingredients are blended, passed through a hammer mill to produce particles essentially all below 50 microns, reblended, sifted through a U.S.S. #50 sieve (0.3 mm. opening) and packaged. This wettable powder is dispersed in water for spray application.

EXAMPLE 5

| | |
|---|---|
| 1-m-fluorophenylbiuret | 35 |
| Sodium ligninsulfonate | 5 |
| Hydrated attapulgite | 1 |
| Sodium pentachlorophenate | 0.5 |
| Water | 58.5 |

The ingredients are mixed together and sand-milled until substantially all the particles of active ingredient are below 5 microns. The slurry is passed through a U.S.S.

50 sieve (74 microns opening) and packaged. This aqueous concentrate can be extended with water for spray application.

EXAMPLE 6

1-m-fluorophenylbiuret, formulated as a wettable powder, is suspended in water at a concentration of 1,000 p.p.m. and 0.25% (w./w.) "Tween" 20 (polyoxyethylene sorbatan monolaurate) wetting agent added. Three applications of this material spaced four days apart are made to Fredonia grape vines beginning at early anthesis. This treatment results in a larger set of grapes and an increase in the weight of many of the bunches on the treated vines. When harvested in the fall the treated vines yield more grapes than similar untreated ones.

EXAMPLE 7

A suspension containing 200 p.p.m. of 1-m-fluorophenylbiuret, formulated as described in Example 5 and containing 0.5% of B-1956 wetting agent (modified phthalic glycerol alkyd resin), is prepared. Developing grape flowers are covered with this solution by dipping, spraying or smearing it on them. This treatment is repeated five days later. This treatment results in a larger set of grapes and more large-sized bunches on the treated plants. Consequently, more grapes are harvested from the treated vines than from similar untreated plants.

EXAMPLE 8

Suspensions containing 500 and 1,000 p.p.m. of 1-m-fluorophenylbiuret and 0.25% by weight of polyoxyethylene sorbatan monolaurate in water were prepared from a wettable powder formulation of the chemical. These suspensions were sprayed on Fredonia grape plants to the point of runoff at the beginning of anthesis, taking care to thoroughly wet the leaves, stems and flower clusters. The treatment was repeated at weekly intervals for a total of three times. Six replicates were made. The untreated controls were sprayed with a water containing the 0.25% of polyoxyethylene sorbatan monolaurate (a wetting agent). The grape vines were maintained normally treated and harvested when ripe. The average yields from the treatments are shown in the table below:

TABLE

| Treatment | Rate, p.p.m. | Mean yields per vine [1] | Weight per bunch [1] |
|---|---|---|---|
| 1-m-fluorophenylbiuret | 500 | 215 | 168 |
| 1-m-fluorophenylbiuret | 1,000 | 266 | 189 |
| Control (treated with wetting agent only) | | 100 | 100 |

[1] As percent of control.

EXAMPLE 9

A 300 p.p.m. suspension of m-fluorophenylbiuret was prepared and 0.5% "Tween" 20 wetting agent was added to it. Sufficient gibberellic acid was added to provide a concentration of 40 p.p.m. A solution containing only the gibberellic acid and wetting agent was also prepared.

The suspension was applied to developing grape flowers at anthesis by dipping the flowers in it. The treatment was repeated seven and fourteen days later. Other grape vines were treated at the same times with the gibberellic acid solution. The weight of grapes per bunch shown in the table below is the average of four replicates.

TABLE

| Treatment | Rate, p.p.m. | Weight per bunch [1] |
|---|---|---|
| m-Fluorophenylbiuret plus gibberellic acid | 500+40 | 135 |
| Gibberellic acid control (treated with wetting agent only) | 40<br>------- | 75<br>100 |

[1] As a percent of control.

EXAMPLE 10

A suspension is formed containing 500 p.p.m. of 1-m-fluorophenyl-4-thiobiuret and 0.25% by weight of "Triton B 1956" wetting agent (modified phthalic glycerol alkyd resin). This suspension is sprayed to runoff on Chardonnay wine grape vines at the time of anthesis. The treatment is repeated five and ten days after the initial treatment.

This treatment causes an increase of 15 to 20% in the berry size when this grape variety is harvested.

EXAMPLE 11

A 1,000 p.p.m. suspension of 1-m-tolylbiuret containinging 0.2% by weight of polyoxyethylene sorbatan monolaurate wetting agent ("Tween" 20) is prepared. This suspension is sprayed to runoff on Chenin Blanc grapes at anthesis. A second application is made 10 days later.

The treatment increases the average size of the grape by 25% or more.

EXAMPLE 12

A suspension containing 1,000 p.p.m. of a wettable powder formulation of 1-phenylbiuret and 0.25% of "Tween" 20 (polyoxyethylene sorbatan monolaurate) in water is prepared. This solution is sprayed on Fredonia grapes to the point of runoff at early anthesis. The treatment is repeated one and two weeks later.

As a result of these treatments, the grapes have tighter more compact branches that have more berries per bunch than similar untreated vines. The treated vines yield more total weight of grapes than similar untreated ones.

The compounds can also be used to prolong the life of harvested green leafy vegetables.

When the compounds are applied for this use, they are applied to the vegetables as a foliar spray before harvest or as a dip or spray treatment after harvest. Rates of 1 to 200 p.p.m. are suitable for this use with rates of 50 to 100 p.p.m. preferred.

This use is illustrated by the following examples.

EXAMPLE 13

A suspension containing 100 p.p.m. of 1-m-fluorophenylbiuret in water with 0.5% "Tween" 20 is prepared and sprayed on a field of lettuce a few days prior to harvest. This treatment delays the yellowing of the lettuce and other changes associated with post-harvest deterioration. As a result the lettuce arrives to the ultimate consumer in better condition and can be stored longer before use.

EXAMPLE 14

A suspension containing 1 p.p.m. of 1-m-fluorophenylbiuret is prepared and freshly harvested lettuce heads are dipped in it for one minute. This treatment prolongs the storage life of the treated lettuce by delaying the loss of green color and other changes that occur after the lettuce is harvested.

What is claimed is:

1. A method for improving the yield of grape plants comprising applying to said plants at anthesis 50 to 2000 p.p.m. of a 1-arylbiuret selected from the group consisting of 1-m-fluorophenylbiuret; 1-m-fluorophenyl-4-thiobiuret; 1-m-tolylbiuret and 1-phenylbiuret.

2. The method of claim 1 wherein the 1-arylbiuret applied is 1-m-fluorophenylbiuret.

3. The method for improving the yield of grape plants comprising applying to said plants at anthesis 100 to 500 p.p.m. of a 1-arylbiuret selected from the group consisting of 1-m-fluorophenylbiuret; 1-m-fluorophenyl-4-thiobiuret; 1-m-tolylbiuret and 1-phenylbiuret.

References Cited

UNITED STATES PATENTS

| 2,258,291 | 10/1941 | Jones | 71—99 |
| 2,776,197 | 1/1957 | Gysin et al. | 71—77 |
| 3,189,431 | 6/1965 | Salzberg | 71—120 |
| 3,253,902 | 5/1966 | Münz et al. | 71—120 |
| 3,342,586 | 9/1967 | Lehureau et al. | 71—120 |

OTHER REFERENCES

Karanov et al., "Chem. structure and growth-reg. etc.;" (1967) CA 67 No. 52913c. (1967).

Vassilev et al., "Structure and growth-reg. etc.;" (1967) CA67 No. 52920c. (1967).

Kalinkevich, "Regulating of fruiting of annual etc.;" (1964) CA 62 p. 8325 (1965).

Bruce et al., "Cytokinin activity of some subst. etc.;" (1966) CA 65 p. 12792 (1966).

Itakura et al., "Gibberellic appl. in kel. to resp. etc.;" (1965) CA 64 p. 10332 (1966).

Venkataratnam, "Effect of gibberellic acid on duab etc.;" (1964) CA 62 p. 4539 (1965).

LEWIS GOTTS, Primary Examiner

G. HOLLRAH, Assistant Examiner

U.S. Cl. X.R.

11—89, 99; 99—154; 260—552, 553